Patented June 22, 1937

2,084,461

UNITED STATES PATENT OFFICE 2,084,461

PROCESS OF INDUCING UNIFORMITY OF BLOOMING AND FRUIT PRODUCTION IN FRUITING PLANTS

Daniel Glenn Sorber, El Monte, and Marston Henchman Kimball, Alhambra, Calif., assignors to Henry A. Wallace as Secretary of Agriculture of the United States of America No Drawing. Application May 14, 1936,
Serial No. 79,778

2 Claims. (Cl. 47—58)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

This invention relates to novel methods for stimulating plant growth and thereby increasing production, especially in the case of fruit trees subject to alternate bearing of crops. This invention applies to the stimulation of growth of both temperate zone and sub-tropical fruiting plants, including the evergreen sorts.

There are thousands of acres of walnuts, peaches and other deciduous fruits, including apples, pears, apricots, plums, prunes, cherries and bush berries now planted in areas where in certain years winter weather conditions are unfavorable to the formation of flowers, the setting of fruit, and the production of a crop. This condition results in failure of trees to produce regular crops, occasioning heavy losses and often seriously crippling the industry. Winter weather conditions have been such in six out of the past eleven years in the fruit sections of southern California as to bring about this condition. Fragmentary historical records show that there have been earlier occasions when damaging warm winter temperatures have occurred, namely, 1918 and 1911. In this latter year, reports of the occurrence of this physiological disturbance were made from southern Missouri. In 1934 peach areas in Georgia were similarly affected. It has also recently been reported from South Africa.

The evergreen subtropical fruits are subject to rest periods, between growth cycles. There may be two or more such cycles in a year. In certain of these subtropicals, for example, the lemon, flower buds form on the new growth which follows such rest periods. Climatic conditions or weather fluctuation may so affect the plants that they fail to come out of their rest period at a time which will result in the blooming, setting and maturation of fruit at the desired season for the greatest economic value. In certain other evergreen subtropicals, as well as in some of the deciduous kinds, the habit of alternate bearing is recognized. For example, the avocado, even in its native tropical habitat, exhibits a marked alternate bearing tendency. As an exotic, this tendency is not decreased, and may even be accentuated. The result is a heavy production one year, followed by lighter production the next, with attendant cultural and marketing difficulties which produce economic losses.

The process used by the inventors to stimulate growth is this:

In carrying out the treatment, the trees are inclosed in tents or other partially gas-tight covers, and ethylene or an unsaturated hydrocarbon gas such as butylene or propylene is then released in these tents or partially gas-tight inclosures, until the concentration within the inclosure is from 1 part of gas to 100 parts of atmosphere, down to 1 part to 100,000 parts. The temperatures during the treatment should not be less than 60° F. or more than 100° F. The length of treatment required will vary from 1 or 2 hours to 24 hours, depending upon the temperature, leakage of gas from the inclosure, and other conditions. Below 60° F., the effect will be minimized; above 100° F. the action is also retarded. Treatment is applied two to six weeks before the normal or desired leafing out, start of the growth cycle, or blooming time for the variety being treated. Other times for treatment may be found equally beneficial.

Having fully disclosed our invention, we claim:

1. The process of inducing uniformity of blooming and fruit production in fruiting plants, which comprises treating the plants with butylene gas.

2. The process of inducing uniformity of blooming and fruit production in fruiting plants, which comprises inclosing the plants in partially gas tight inclosures, introducing butylene gas into such plant containing inclosures, said gas being in an amount sufficient to establish a concentration within the inclosures of 1 part gas to 100 parts of atmosphere down to 1 part gas to 100,000 parts of atmosphere and maintaining the temperature within the inclosures at 60° F. to 100° F. for a period of from 1 to 24 hours.

DANIEL GLENN SORBER.
MARSTON HENCHMAN KIMBALL.